US007118644B2

(12) United States Patent
Chang et al.

(10) Patent No.: US 7,118,644 B2
(45) Date of Patent: Oct. 10, 2006

(54) IMAGE TRANSFER MEDIUM AND PROCESS FOR PRODUCING SAME

(76) Inventors: Chih-Lung Chang, 4Fl.-1, No. 41 Tianyu St., Shrlin Chiu, Taipei (TW) 111; Yu-Chih Cheng, 2Fl., No. 23, Lane 136, Kangle St., Neihu Chiu, Taipei (TW) 114; Hong-Che Yen, 10Fl., No. 36, Sec. 2, Chengde Rd., Datung Chiu, Taipei (TW) 103; Yen-Feng Lin, 5Fl., No. 5, Alley 5, Lane 94, Wenlin N. Rd., Beitou Chiu, Taipei (TW) 112

( * ) Notice: Subject to any disclaimer, the term of this patent is extended or adjusted under 35 U.S.C. 154(b) by 17 days.

(21) Appl. No.: 10/735,322

(22) Filed: Dec. 12, 2003

(65) Prior Publication Data

US 2004/0123943 A1 Jul. 1, 2004

(30) Foreign Application Priority Data

Dec. 12, 2002 (TW) ............................... 91135917 A

(51) Int. Cl.
*B44C 1/10* (2006.01)
*B44C 1/20* (2006.01)
*B44C 1/17* (2006.01)
*B32B 38/10* (2006.01)

(52) U.S. Cl. ...................... 156/235; 156/230; 156/238; 156/240; 156/247; 156/249; 40/540; 40/541; 40/564

(58) Field of Classification Search ................ 156/230, 156/234, 238–240, 277, 272.2; 40/540, 541, 40/564
See application file for complete search history.

(56) References Cited

U.S. PATENT DOCUMENTS

| | | | | |
|---|---|---|---|---|
| 3,900,633 | A | 8/1975 | Piron | |
| 5,891,289 | A * | 4/1999 | Zemel | 156/235 |
| 6,059,914 | A * | 5/2000 | Suss | 156/230 |
| 6,491,781 | B1 * | 12/2002 | Kreckel et al. | 156/277 |
| 6,610,386 | B1 * | 8/2003 | Williams et al. | 283/113 |

FOREIGN PATENT DOCUMENTS

| | | |
|---|---|---|
| CN | 1282767 | 2/2001 |

* cited by examiner

*Primary Examiner*—Curtis Mayes
*Assistant Examiner*—Sonya Mazumdar
(74) *Attorney, Agent, or Firm*—Berkeley Law & Technology Group, LLC

(57) ABSTRACT

An image-transfer medium includes a transparent substrate and a transferable material formed on a first surface of the substrate. A selected portion of the transferable material can be transferred in an arbitrary shape to an article to form a personalized image by a cold transfer-printing operation. Moreover, the remaining hollowed portion after the removal of the selected portion, including the transparent substrate, can be adhered to the same or another article having a light-transmitting surface to exhibit special lightening effect.

3 Claims, 10 Drawing Sheets

IMAGE TRANSFER MEDIUM AND PROCESS FOR PRODUCING SAME

FIELD OF THE INVENTION

The present invention relates to an image-transfer medium and how to use this image-transfer medium, and more particularly to an image-transfer method and the use of an image-transfer medium for providing an arbitrary light-transmissible image onto an article.

BACKGROUND OF THE INVENTION

Transfer-printing operation is widely used for printing images onto surfaces of selected articles such as cards, clothes, papers, cups or equipments. In general transfer-printing operations, a plurality of predetermined images are first printed onto a transparent film, and then desired images are selected to be transfer-printed onto the target article from the transparent film.

FIG. 1(*a*) illustrates a conventional image-transfer medium. The image-transfer medium 10 comprises a transparent film substrate 11 and a transferred material 12. The transferable layer 12 further comprises an ink layer 121 and a pressure-sensitive adhesive layer 122. The transferable layer 12 is laminated onto a surface 112 of the transparent film substrate 11, facing the target article (not shown).

Take an image-transfer medium with alphabetic letters for example. When an image "PRIMAX" is to be printed on a target article such as a card, the image-transfer medium 10 is put on the target article with the transferable layer 12 in contact with the surface of the target article. Then, the selected letters, i.e. P, R, I, M, A and X in the transferable layer of FIG. 1(*b*), are stripped from the image-transfer medium 10 and simultaneously adhered to the target article one by one by applying a depressing force to the other surface 111 the transparent film substrate 11 at each of the corresponding positions of the selected letters.

In the prior art, the images to be transfer-printed are predetermined by manufactures. Consequently, for transfer-printing a personalized image such as signatures, favorite signs or handwritings, the desirable image should be printed in advance by the manufacturers and included in the ink layer 121 of the transferable layer 12 of the image-transfer medium 10. Since people tend to like the new and loathe the old, the uniform image-transfer mediums are no longer satisfying.

SUMMARY OF THE INVENTION

It is an object of the present invention to provide a use of an image-transfer medium allowing the user to transfer-print personalized images.

It is another object of the present invention to provide a use of an image-transfer medium allowing an article to be decorated with not only colored but also transparent patterns.

It is another object of the present invention to provide a method for applying an image-transfer medium to an article to create a personalized image with particular visual effect.

A first aspect of the present invention relates to a method for applying an image onto an article. The article comprising a light transmissible surface and a light source disposed under the light transmissible surface. The method comprises steps of: providing an image-transfer medium comprising a transparent substrate and a transferable material formed on a first surface of the substrate; removing a selected portion of the transferable material to obtain a hollowed transferable material with a specific pattern vacancy; and adhering the remaining transferable material onto the light transmissible surface of the article, thereby allowing light emitted by the light source to penetrate through the specific pattern vacancy.

According to a second aspect of the present invention, a use of an image-transfer medium for applying an image onto an article. The image-transfer medium comprises a transparent substrate, a transferable ink layer and a pressure-sensitive adhesive layer. The use comprises cold transfer-printing a first selected portion of the transferable ink layer onto the article when an ink pattern image is required; and removing a second selected portion of the transferable ink layer, and adhering the remaining transferable ink layer along with the transparent substrate onto the article when a hollowed pattern image is required.

Preferably, the cold transfer-printing operation and/or the ink-layer removing operation is performed by applying a depressing force directly onto the transparent substrate at positions corresponding to the first selected portion of the transferable ink layer with a writing tool or stamping tool so that the pressure-sensitive adhesive layer adheres the selected portion of the transferable ink layer away from the transparent substrate.

Preferably, the image-transfer medium further comprises an isolation layer containing a tack reducing agent for decreasing adhesion between the transferable ink layer and the pressure-sensitive adhesive layer.

In accordance with the present invention, the transferable ink layer can be a continuous layer or formed with a plurality of the transferable dots. Each of the dots has a shape selected from a group consisting of a circle, an ellipse, a triangle, a rectangle and a honeycomb.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1(*b*) is a schematic diagram exemplifying a general transferable pattern of the conventional image-transfer medium in FIG. 1(*a*);

DETAILED DESCRIPTION OF THE PREFERRED EMBODIMENT

Figure 1A:
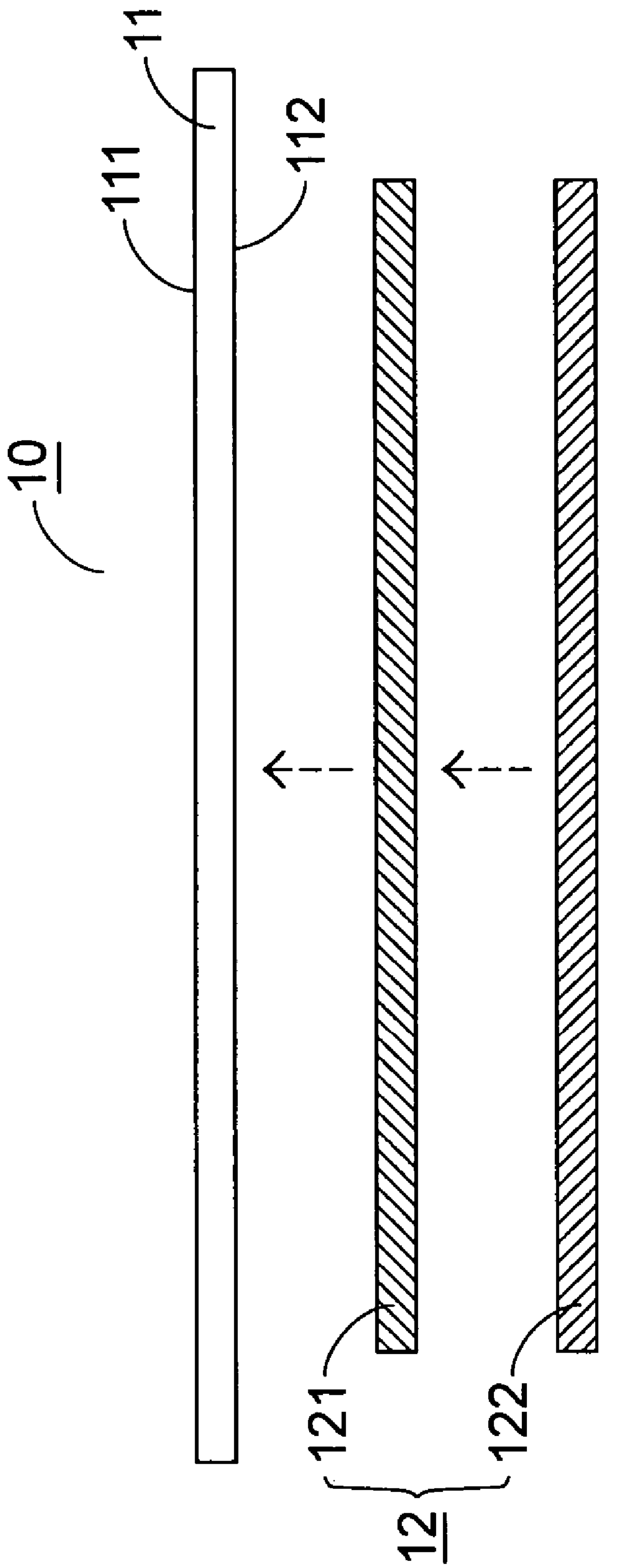
Fig.1(a) PRIOR ART
FIG. 1(*a*) is a schematic diagram showing the lamination of a conventional image-transfer medium.
Figure 1B:
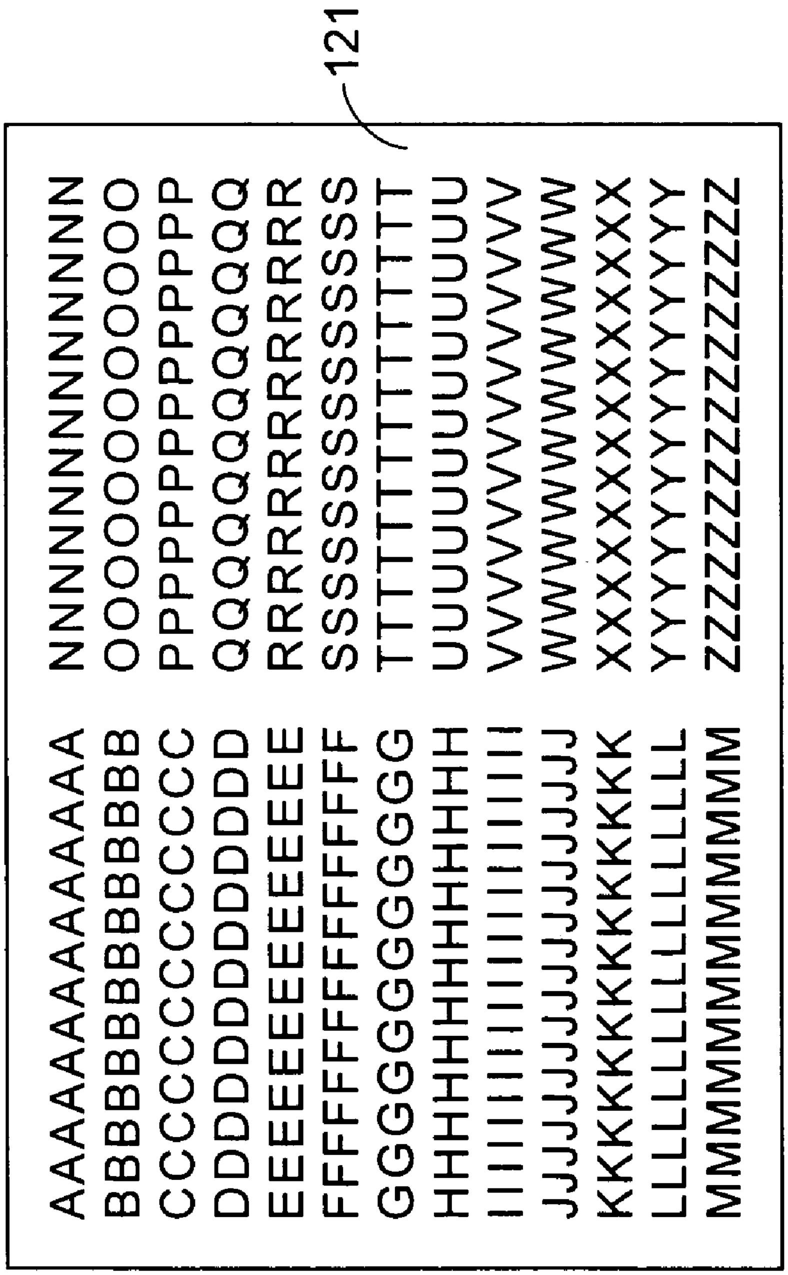
Fig.1(b) PRIOR ART
Figure 2:
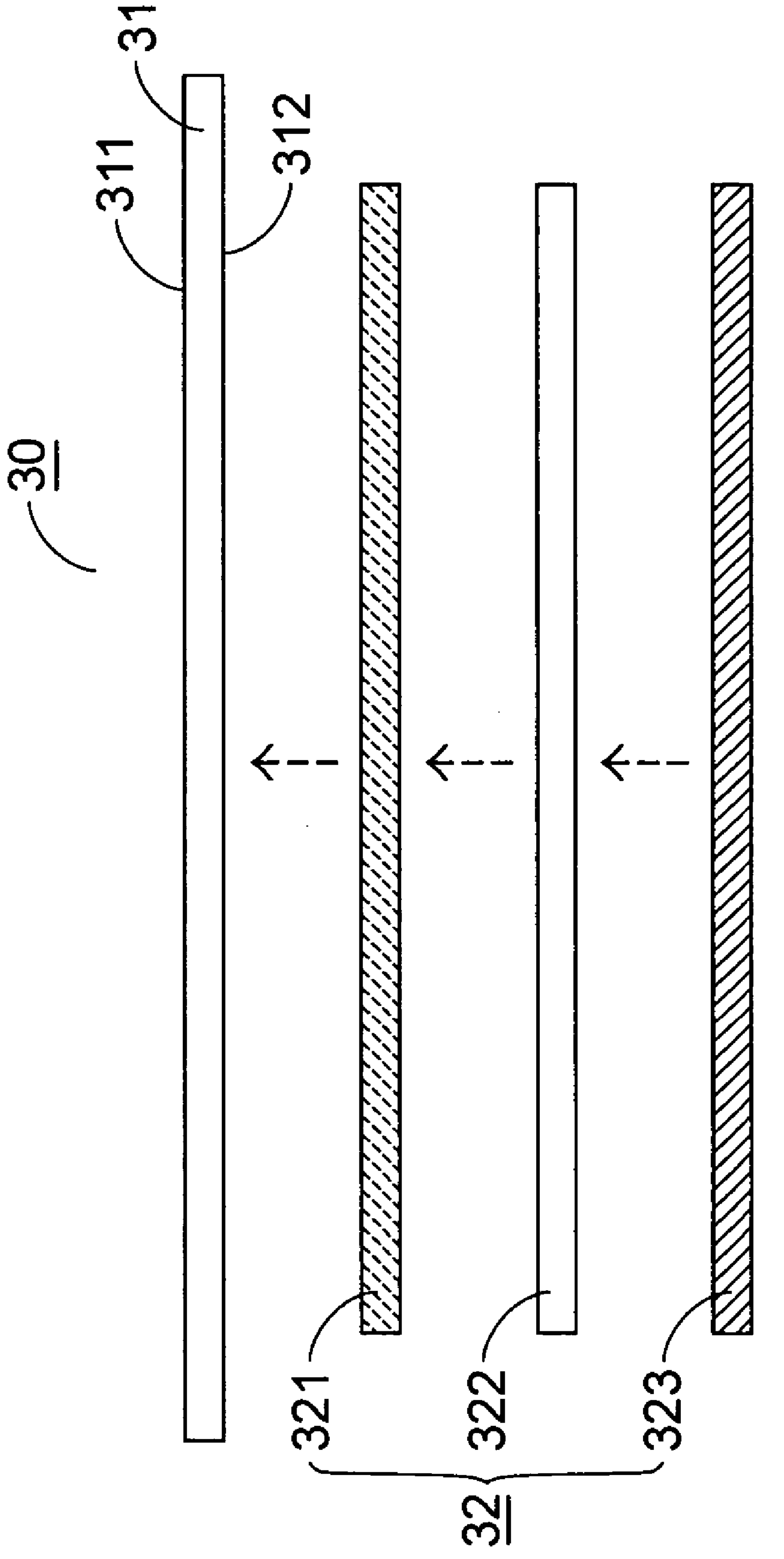
FIG. 2 is a schematic diagram showing the lamination of an image-transfer medium according to a preferred embodiment of the present invention.

Referring to FIG. 2, an image-transfer medium 30 according to a preferred embodiment of the present invention comprises a transparent film substrate 31 and a transferable laminated material 32. For example, the transparent film substrate 31 is made of a flexible and transparent material such as biaxially oriented polypropylene (BOPP). The transferable laminated material 32 comprises an ink layer 321, a pressure-sensitive adhesive layer 323 and an isolation layer 322 sandwiched between the ink layer 321 and the pressure-sensitive adhesive layer 323. The transferable laminated material 32 is attached onto a surface 312 of the transparent film substrate 31, and directly contacts with the target article (not shown) while using.

The ink layer 321 is constituted of one or more pigments and some additives. The composition is appropriately selected in order to achieve optimal transfer-printing effect. For example, for black ink, the composition of the ink layer 321 comprises 5~20 wt % black powder, 25~55 wt % copolymer resin, 2~8 wt % dioctylphosphate, 10~40 wt % sophorone, 5~35 wt % SOLVESSO™ (an aromatic hydrocarbon solvent from Imperial Oil Limited) and 5~35 wt % solvent. On the other hand, for silver ink, the composition of the ink layer 321 comprises 5~35 wt % silver powder, 20~50 wt % copolymer resin, 2~8 wt % dioctylphosphate, 5~35 wt % isophorone, 5~35 wt % SOLVESSO™ and 5~35 wt % solvent. The isolation layer 322 is also transparent, and contains a tack reducing agent for decreasing adhesion between the ink layer 321 and the pressure-sensitive adhesive layer 323 in order that the ink patterns can be stripped and transferred neat.

For transfer-printing personalized image onto an article, the ink of the image-transfer medium should be strippable as any arbitrary pattern. In order to achieve this purpose, the ink layer 321 is preferably a continuous layer or consists of a number of very close small units, e.g. dots.

Figure 3A:
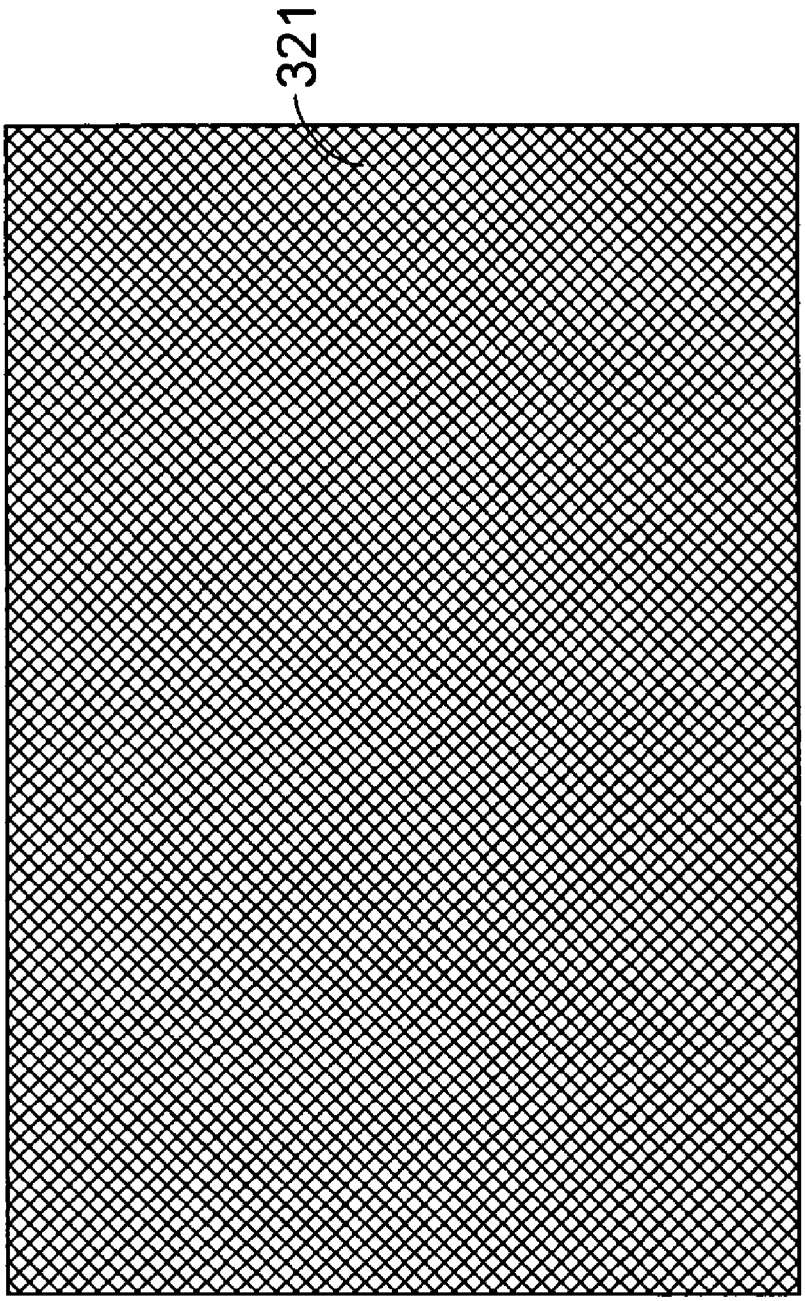
FIGS. 3(*a*)~3(*c*) are three examples of patterns in the ink layer of FIG. 2 according to the present invention.
Figure 3B:
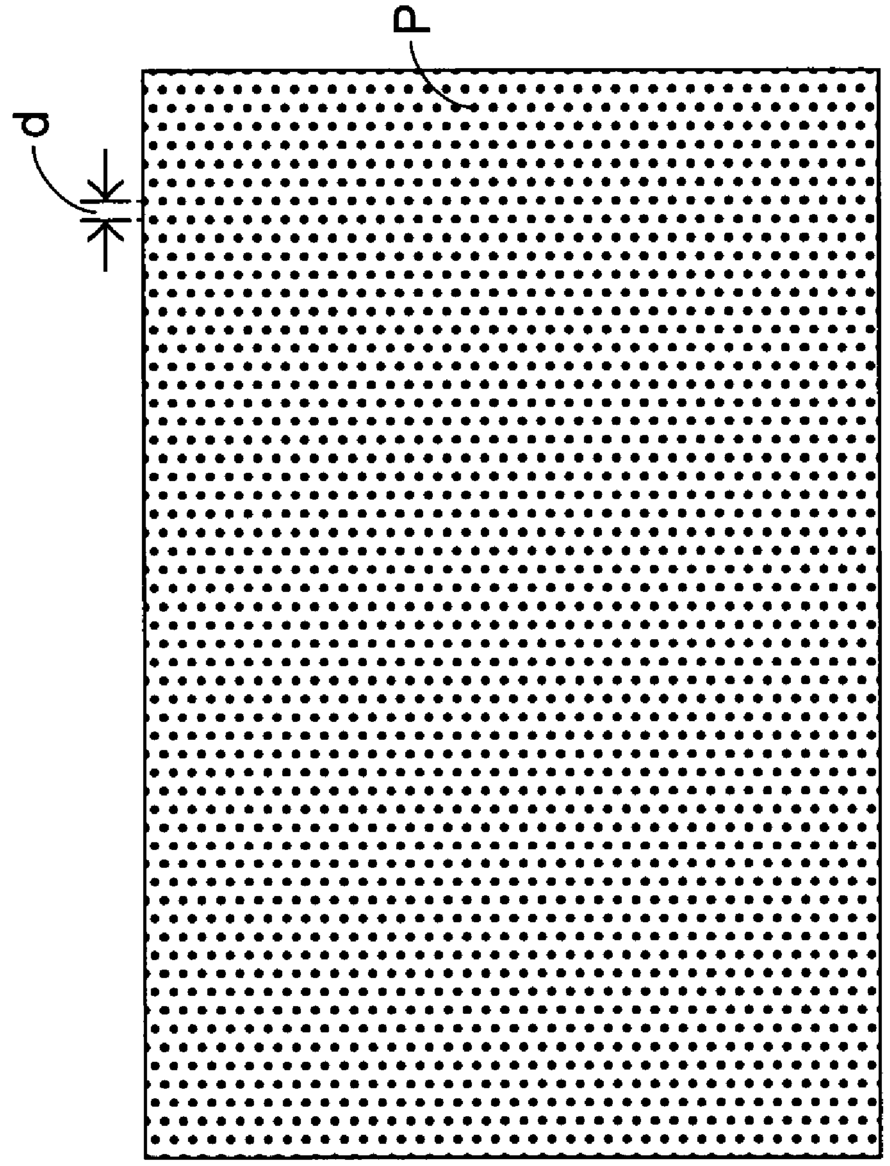
Figure 3C:
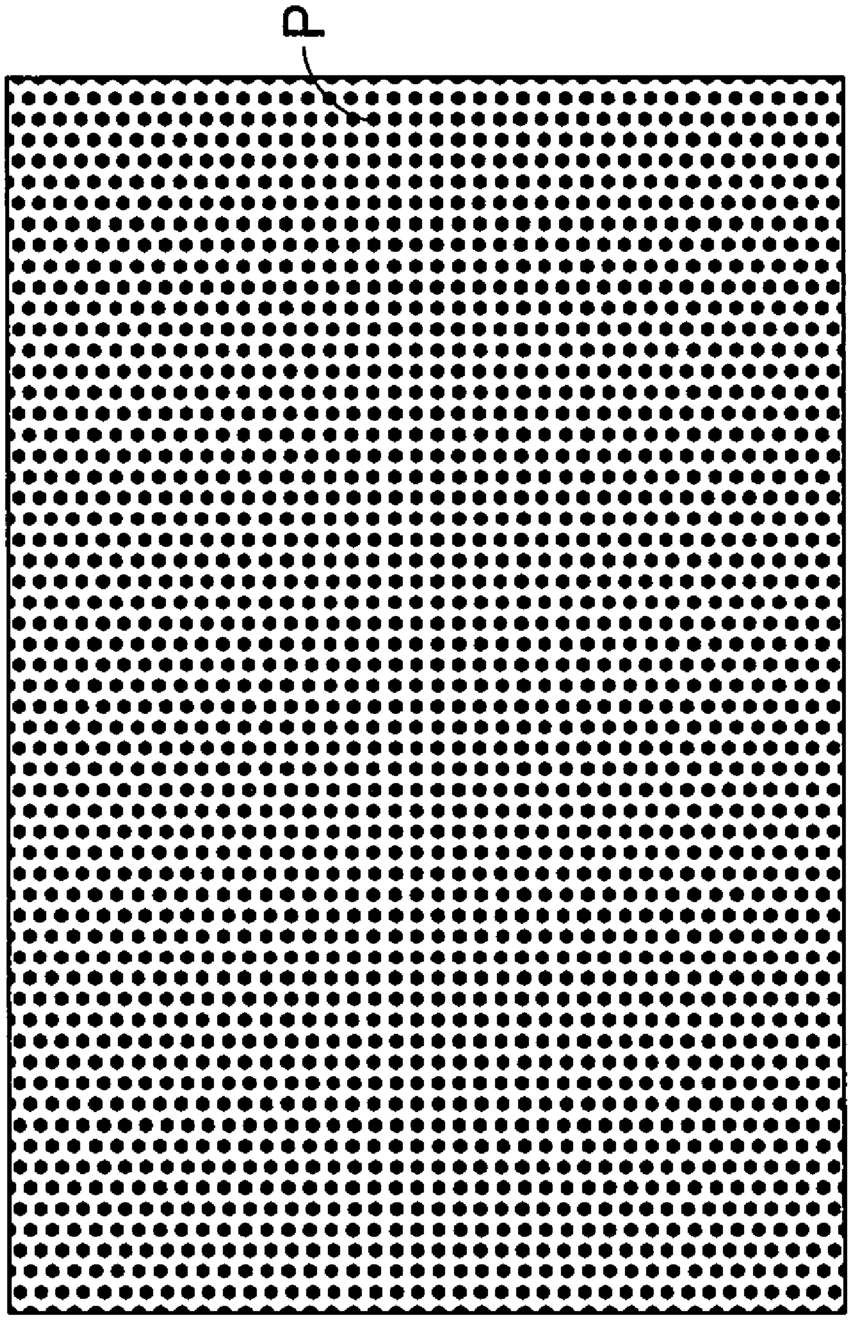

FIGS. 3(*a*)~3(*c*) are schematic diagrams showing two examples of ink layer patterns, which can achieve the above-mentioned purposes. In the embodiment of FIG. 3(*a*), the ink layer 321 is a continuous layer. Alternatively, the ink layer 321 comprises a plurality of transferable dots P discretely arranged at regular interval d, as shown in FIG. 3(*b*) or 3(*c*). The interval d between two adjacent dots is not particularly limited, but it is preferably not too small to be produced or not too big in consideration of visual effect. For example, the density of the transferable dots P is at least 20 dots per inch, and preferably in a range of 80~200 dots per inch. The transferable dots P of the ink layer 321 can be formed by a known halftone printing technology.

The shape of each single transferable dot can be arbitrary. In addition to the circular shape and the honeycomb shape as shown in FIGS. 3(*b*) and 3(*c*), it can also be an ellipse, a triangle, a rectangle, etc.

In order to impart proper dot size and density to the ink layer 321, the halftone technique with proper meshes is applied hereto. Firstly, the ink layer 321 is applied onto the surface 312 of the transparent film substrate 31 by 100 mesh/inch. Then, the isolation sub-layer 322 is applied onto the ink layer 321 by 150 mesh/inch. Afterward, the pressure-sensitive adhesive layer 323 is applied onto the isolation layer 322 by 200 mesh/inch. In such way, an image-transfer medium having a transferable dot density of 100 dots per inch is obtained.

The use of the image-transfer medium of the present invention will be described in more details with reference to the following examples. A peripheral mouse device is used as the target device where a desired pattern is to be attached. The desired pattern can be arbitrarily designed as mentioned above, and the letter “A” is exemplified herein as the desired pattern.

Figure 4A:
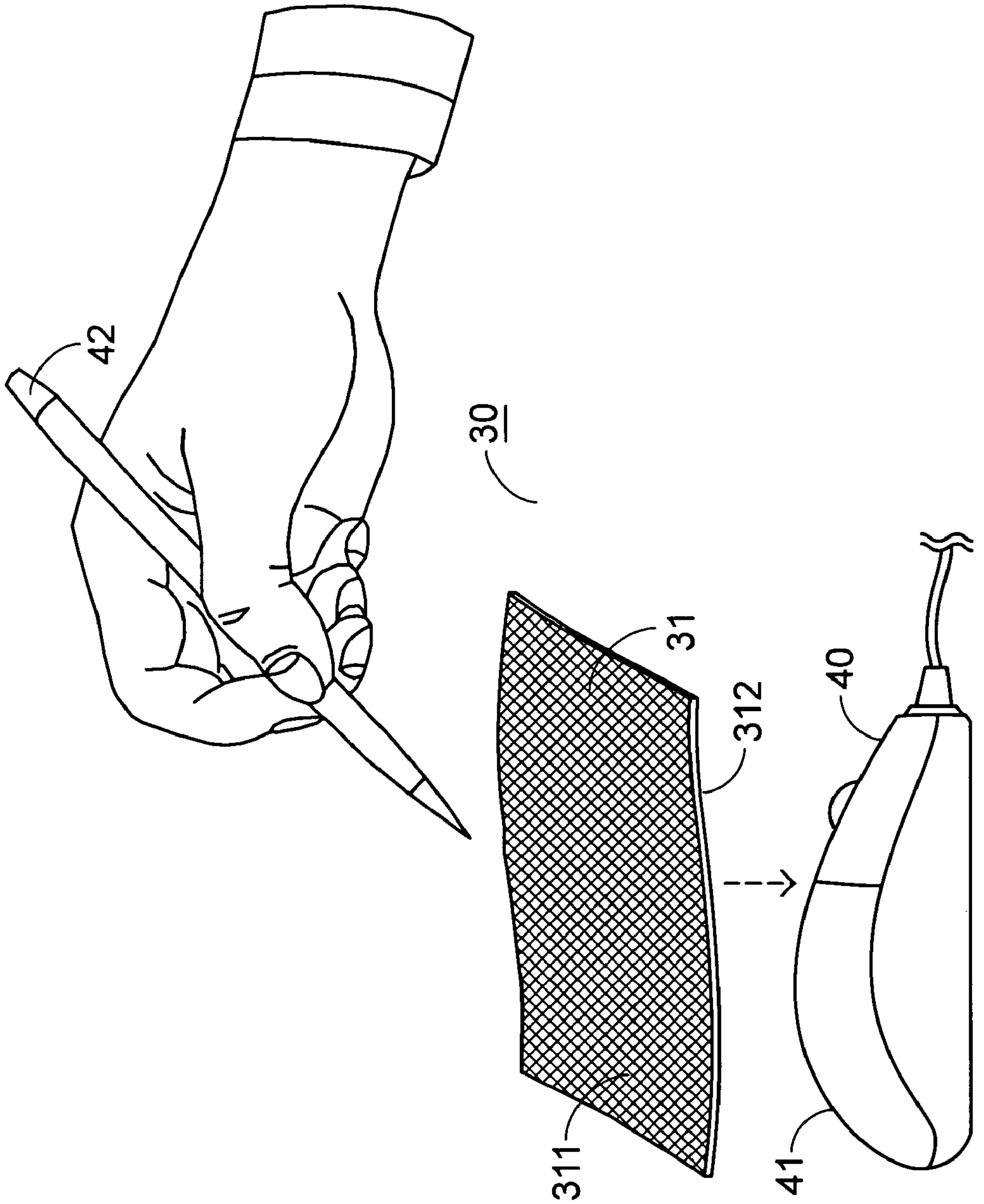
FIGS. 4(*a*) and 4(*b*) exemplify the use of the image-transfer medium according to the present invention.
Figure 4B:
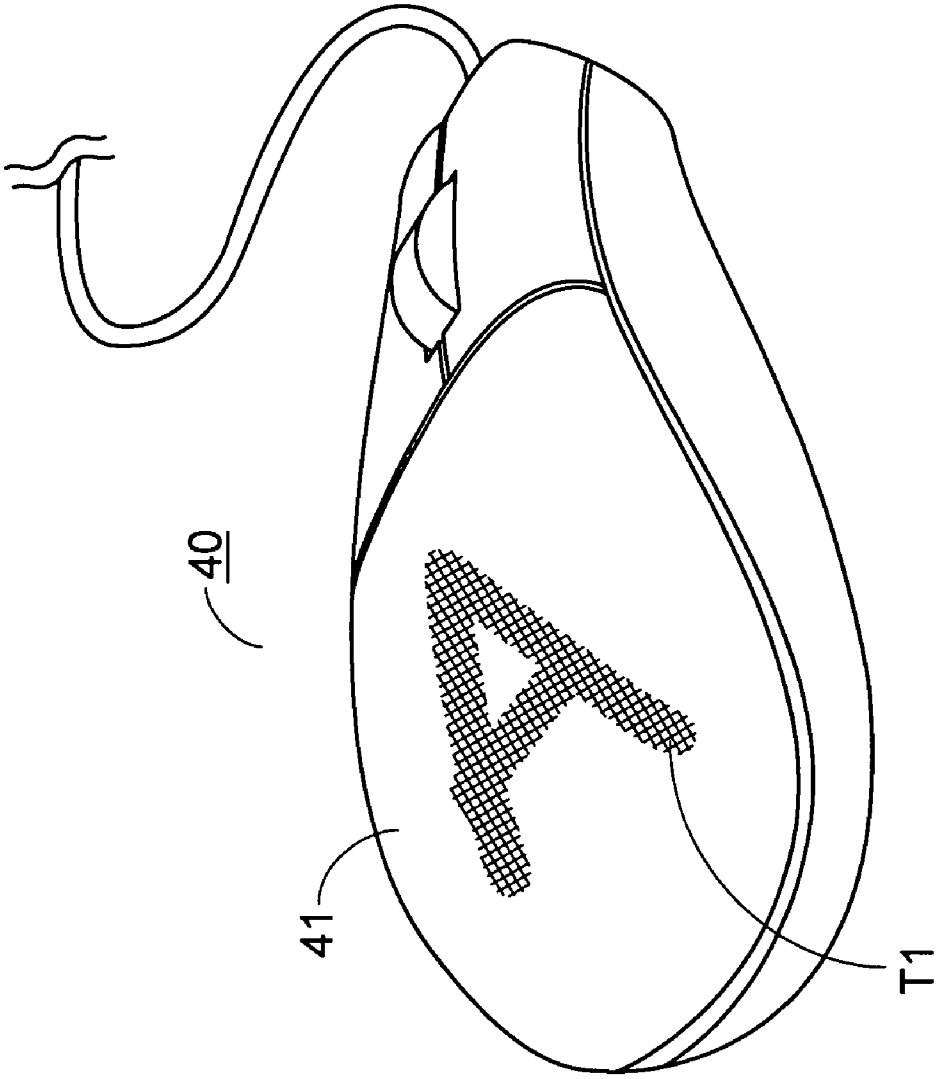

In FIG. 4(*a*), the surface 312 of the image-transfer medium 30 is firstly placed in contact with a surface 41 of the mouse 40. Then, a cold transfer-printing operation is performed. That is, a depressing force is exerted onto the opposite surface 311 the transparent film substrate 31 to track the letter pattern “A”. By this way, the portion T1 of the ink layer 321, which receives the depressed force and corresponds to the letter pattern “A”, is stripped from the image-transfer medium 30 and adhered to the mouse 40 via the pressure-sensitive adhesive layer 323. After the remaining portion except the portion T1 is removed from the mouse 40, the appearance of the mouse 40 is as shown in FIG. 4(*b*). For example, the cold transfer-printing operation can be performed through a writing operation using a writing tool 42 such as a pen, a stick or a pencil. The cold transfer-printing operation can also be performed with a stamp tool (not shown) to stamp the desired pattern onto the target article.

The above embodiment is illustrated by referring to a mouse device. Nevertheless, the present invention can be applied to any other suitable articles such as cards, clothes, papers, cups or equipments.

Figure 5A:
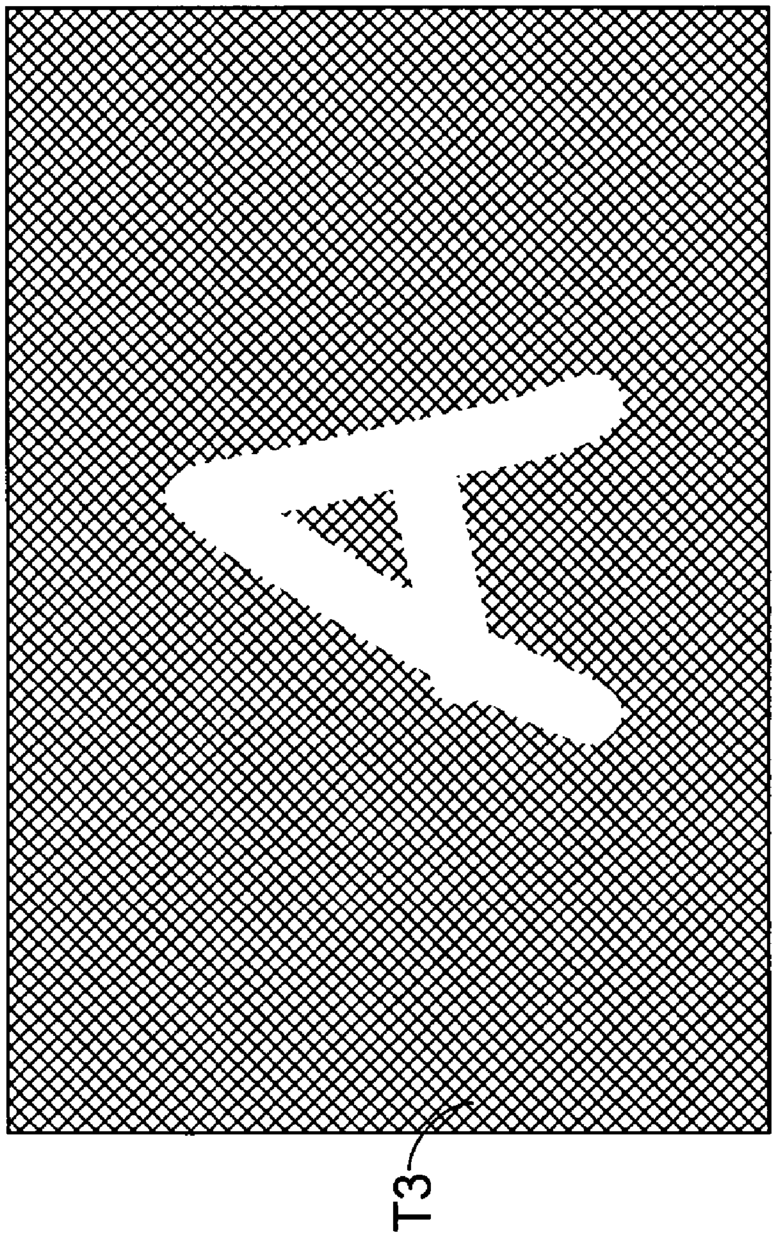
FIGS. 5(*a*) and 5(*b*) exemplify alternative use of the image-transfer mediums according to the present invention.
Figure 5B:
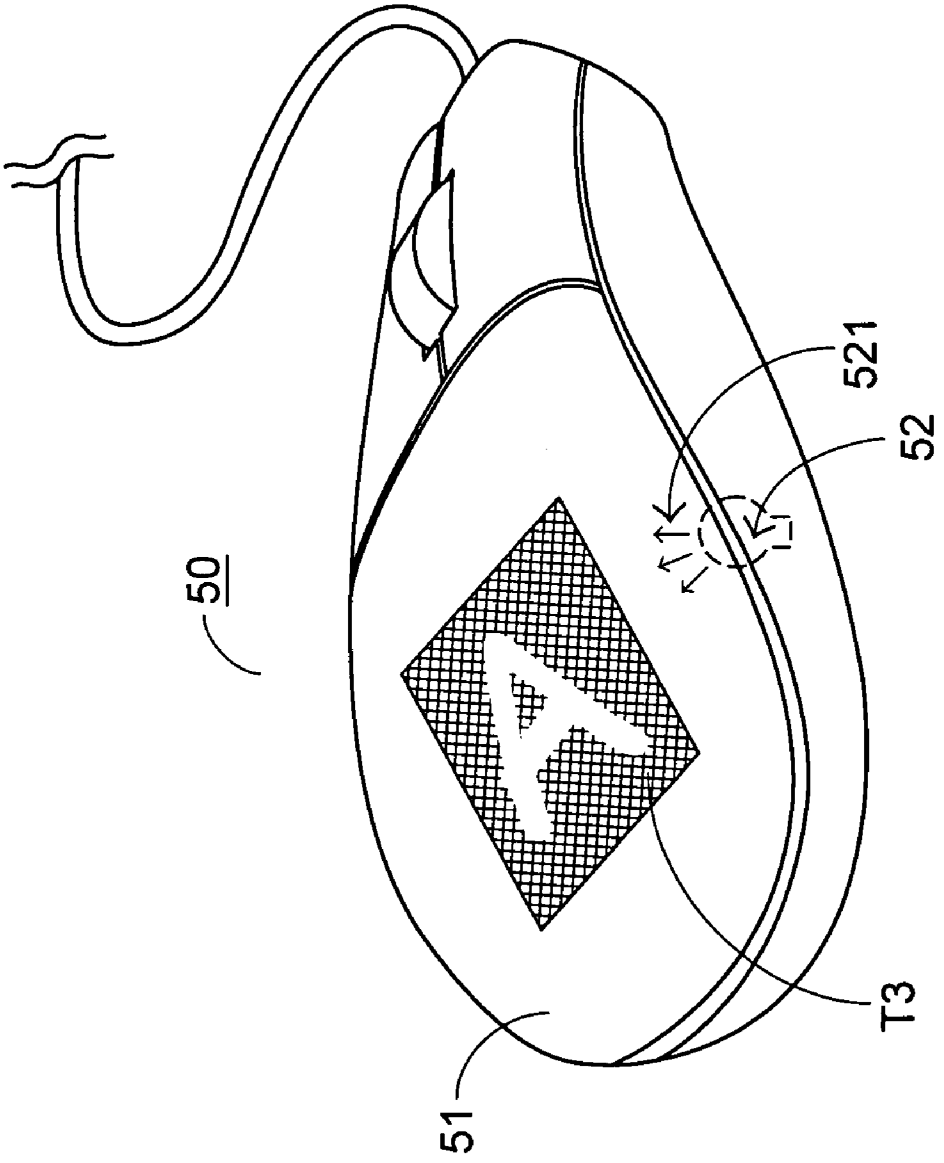

An alternative use of the image-transfer medium 30 of the present invention is illustrated in FIGS. 5(*a*) and 5(*b*). In this example, the desired letter pattern “A” is first removed from the ink layer by being transfer-printed onto a non-target article or another position of the target article (not shown). Then, the remaining portion T3 is adhered to the mouse device 50 having a light transmissible housing along with the transparent film substrate 31. Through the light emitted by a light source 52 inside the mouse 50 and penetrating the transparent top surface 51, the hollowed letter pattern “A” can be exhibited with special lightening effect.

From the above description, the image-transfer medium of the present invention is capable of transfer-printing a personalized image according to the user’s requirement.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for applying an image onto an article, said article comprising a light transmissible surface and a light source disposed under said light transmissible surface, said method comprising steps of:
   - providing an image-transfer medium comprising a transparent substrate and a transferable material formed on a first surface of said substrate wherein said transferable material is formed with a plurality of transferable dots, each of which has a shape selected from a group consisting of a circle, an ellipse, a triangle, a rectangle and a honeycomb;
   - removing a selected portion of said transferable material to obtain a hollowed transferable material with a specific pattern vacancy; and
   - adhering the remaining transferable material onto said light transmissible surface of said article, thereby allowing light emitted by said light source to penetrate through the specific pattern vacancy.

2. The method according to claim 1 wherein said transferable material comprises a pressure-sensitive adhesive layer, and said step of removing said selected portion of said transferable material is performed by applying a depressing force onto a second surface of the substrate with a writing tool or stamping tool.

3. The method according to claim 1 wherein said remaining transferable material is adhered to said article along with said transparent substrate.

* * * * *